(12) United States Patent
Hashimoto et al.

(10) Patent No.: US 8,088,456 B2
(45) Date of Patent: *Jan. 3, 2012

(54) PLASTIC SUBSTRATE AND LIQUID CRYSTAL DISPLAY DEVICE HAVING SAME

(75) Inventors: Yoshito Hashimoto, Nabari (JP); Noriko Watanabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/764,297

(22) Filed: Apr. 21, 2010

(65) Prior Publication Data

US 2010/0203786 A1 Aug. 12, 2010

Related U.S. Application Data

(63) Continuation of application No. 10/538,118, filed as application No. PCT/JP03/15748 on Dec. 9, 2003, now Pat. No. 7,794,803.

(30) Foreign Application Priority Data

Dec. 12, 2002 (JP) ................................. 2002-360694

(51) Int. Cl.
*G02F 1/13363* (2006.01)
(52) U.S. Cl. ........ 428/1.3; 428/1.5; 428/299.4; 349/117
(58) Field of Classification Search .................... 428/1.3, 428/1.31, 1.5, 297.4, 299.4; 349/96, 117–118, 349/122
See application file for complete search history.

(56) References Cited

U.S. PATENT DOCUMENTS

| 2,346,766 | A | * | 4/1944 | Land | 359/491 |
|---|---|---|---|---|---|
| 2,699,706 | A | * | 1/1955 | Boone | 359/498 |
| 3,016,071 | A | * | 1/1962 | Kahn et al. | 359/497 |
| 3,137,601 | A | * | 6/1964 | Menzer | 264/171.11 |
| 3,218,926 | A | * | 11/1965 | Boone | 359/489 |
| 3,353,895 | A | * | 11/1967 | Emerson | 359/492 |
| 3,370,111 | A | * | 2/1968 | Boone | 264/1.34 |
| 4,025,580 | A | * | 5/1977 | Taylor | 525/193 |
| 4,087,746 | A | * | 5/1978 | Kanae | 324/631 |
| 5,730,922 | A | * | 3/1998 | Babb et al. | 264/258 |
| 5,763,054 | A | * | 6/1998 | Samec et al. | 428/195.1 |
| 6,503,831 | B2 | * | 1/2003 | Speakman | 438/674 |
| 6,875,481 | B2 | * | 4/2005 | Nishimura | 428/1.1 |
| 7,242,453 | B2 | * | 7/2007 | Saida et al. | 349/159 |
| 2002/0060762 | A1 | * | 5/2002 | Arakawa | 349/117 |

OTHER PUBLICATIONS

JPO Website Machine English Translation of JP 2001-133761, Ikeda Mitsushi, May 18, 2001.*
Hashimoto et al.; "Plastic Substrated and Liquid Crystal Display Device Having Same"; U.S. Appl. No. 10/538,118, filed Jun. 7, 2005.

* cited by examiner

*Primary Examiner* — Sophie Hon
(74) *Attorney, Agent, or Firm* — Keating & Bennett, LLP (57) ABSTRACT

A plastic substrate according to the present invention is used in optical instruments. The plastic substrate includes a composite substrate 10 in which fibers 11 are embedded in a resin matrix 12. The fibers are arranged in at least one predetermined direction within a plane of the composite substrate. The composite substrate substantially transmits visible radiation and has a predefined retardation that is associated with the predetermined direction in which the fibers are arranged.

3 Claims, 5 Drawing Sheets (a)

PLASTIC SUBSTRATE AND LIQUID CRYSTAL DISPLAY DEVICE HAVING SAME

This application is a continuation of application Ser. No. 10/538,118, now U.S. Pat. No. 7,794,803, filed on Jun. 7, 2005, as a national stage entry of International Application No. PCT/JP2003/015748, filed on Dec. 9, 2003.

BACKGROUND OF THE INVENTION

1. Field of the Invention

The present invention relates to a plastic substrate and more particularly relates to a transparent plastic substrate for use in optical instruments and a liquid crystal display device including such a substrate.

2. Description of the Related Art

A flat panel display such as an LCD is expected to have even a lighter weight, a further reduced thickness and a higher degree of shock resistance.

To meet these demands, techniques of using a plastic substrate instead of the conventional glass substrate have been proposed. The plastic substrate may be made of either a thermosetting resin such as a polyimide resin or an epoxy resin or a thermoplastic resin such as polycarbonate.

Generally speaking, the resin is inferior to the glass in thermal resistance and dimensional stability, among other things. For example, a plastic substrate usually has a resistant temperature of approximately 250° C. or less, although the temperature may vary somewhat with its resin material. And the resistant temperature is lower than a process temperature with a glass substrate by 100° C. or more. In various process steps of forming circuit components, including electrodes, interconnects and semiconductor devices, on a plastic substrate (e.g., in a film deposition process step, in particular), the process temperature cannot be decreased beyond a certain limit. That is why the development of a plastic substrate with high thermal resistance, which is much closer to that of the conventional glass substrate, is awaited. Also, depending on its intended application, the plastic substrate may need to have almost as high colorlessness and transparency as the glass substrate.

Most of the plastic substrates on today's market cannot satisfy all of these requirements at the same time. For example, a polyimide resin normally has excellent thermal resistance but its color is a problem. Meanwhile, resins with good colorlessness and transparency often exhibit poor thermal resistance.

As a measure for increasing the thermal resistance of a plastic substrate, somebody proposed that a protective coating be provided on the surface of a substrate made of a resin (which will be referred to herein as a "resin substrate").

Another person proposed a method of making a plastic substrate of a composite material, in which a resin and a filler are mixed together, in order to increase the thermal resistance and dimensional stability thereof. A substrate made of a composite material will be referred to herein as a "composite substrate". For example, Japanese Patent Application Laid-Open Publication No. 11-2812 discloses a reflective conductive substrate including a composite substrate, which is obtained by impregnating a piece of glass fiber cloth with a resin.

On the other hand, Japanese Patent Application Laid-Open Publication No. 2001-133761 discloses a plastic substrate including a composite substrate in which a plurality of linear or striped fibers are arranged in a resin so as not to contact with each other. According to Japanese Patent Application Laid-Open Publication No. 2001-133761, if a composite substrate with a fiber cloth (i.e., woven fabric) embedded as disclosed in Japanese Patent Application Laid-Open Publication No. 11-2181 mentioned above is used, then very small unevenness is created on the surface of the substrate by either the textured or overlapped portions of the fiber cloth, thus causing deterioration in resultant display quality. However, according to this publication, a composite substrate with a flat surface can be obtained by adopting its proposed arrangement.

The present inventors analyzed the optical properties of such a composite substrate, in which fibers were embedded in a resin matrix, from various angles. As a result, we discovered that when an LCD was fabricated with such a conventional composite substrate, leakage of light occurred due to a retardation associated with the direction in which the fibers were arranged in the composite substrate (i.e., the direction defined by the major axis of the fibers), thus interfering with high-quality display.

That is to say, the present inventors discovered that the conventional fiber-embedded composite substrate had a retardation associated with the fiber arrangement direction. And we discovered that the conventional composite substrate would cause deterioration in display quality when used to make an LCD because its retardation had not been adjusted to a predetermined value. In other words, even if the unevenness caused by the textured or overlapped portions of the fiber cloth could be eliminated as disclosed in Japanese Patent Application Laid-Open Publication No. 2001-133761, the display quality would still decrease unless the retardation is controlled to its predetermined value. Japanese Patent Application Laid-Open Publication No. 2001-133761 does mention the distribution of refractive indices but is silent about retardations (phase differences) and its distribution. Thus, they don't seem to have known that the fiber-embedded composite substrate had a retardation associated the fiber arrangement direction.

In the foregoing description, problems to arise when a plastic substrate is used in an LCD have been discussed. However, those problems caused by the plastic substrate's uncontrolled retardation are encountered no just in LCDs but also in other types of optical instruments, e.g., optical instruments utilizing polarization, in particular.

SUMMARY OF THE INVENTION

In order to overcome the problems described above, a primary object of the present invention is to provide a plastic substrate that contributes to realizing high-quality display when used as a substrate for a display device.

Another object of the present invention is to improve the display quality of a liquid crystal display device including a plastic substrate.

A plastic substrate according to the present invention is used in optical instruments. The plastic substrate includes a composite substrate in which fibers are embedded in a resin matrix. The fibers are arranged in at least one predetermined direction within a plane of the composite substrate. The composite substrate substantially transmits visible radiation and has a predefined retardation that is associated with the predetermined direction in which the fibers are arranged.

In one preferred embodiment, the at least one predetermined direction in which the fibers are arranged includes two or more directions.

In another preferred embodiment, the at least one predetermined direction includes two nearly orthogonal directions.

In another preferred embodiment, the composite substrate has an in-plane retardation ($n_x$-$n_y$) of substantially zero.

In another preferred embodiment, the composite substrate has negative uniaxial anisotropy.

In another preferred embodiment, the composite substrate functions as a quarter-wave plate.

The fibers may be embedded in the resin matrix as a bundle of fibers, a woven fabric or a nonwoven fabric.

A plastic substrate according to the present invention may further include a protective coating on at least one principal surface of the composite substrate.

A liquid crystal display device according to the present invention is characterized by including any of the plastic substrates described above and a liquid crystal layer.

In one preferred embodiment, the liquid crystal display device may further include a polarizer, which is arranged such that the absorption axis of the polarizer is either substantially parallel or substantially perpendicular to the at least one predetermined direction in which the fibers are arranged.

BRIEF DESCRIPTION OF THE DRAWINGS

FIGS. 1(a) and 1(b) schematically illustrate a configuration for a plastic substrate 10 according to a preferred embodiment of the present invention, and FIG. 1(c) schematically shows the index ellipsoid thereof.

FIGS. 2(a) and 2(b) schematically illustrate a configuration for a plastic substrate 20 according to another preferred embodiment of the present invention, and FIG. 2(c) schematically shows the index ellipsoid thereof.

DETAILED DESCRIPTION OF PREFERRED EMBODIMENTS

Hereinafter, a plastic substrate according to a preferred embodiment of the present invention and a liquid crystal display device including such a substrate will be described with reference to the accompanying drawings. It should be noted that the present invention is in no way limited to the following specific preferred embodiments but may be used effectively in various other applications in which the retardation of a plastic substrate affects the characteristic.

FIGS. 1(a) and 1(b) schematically illustrate a configuration for a plastic substrate 10 according to a preferred embodiment of the present invention. More specifically, FIGS. 1(a) and 1(b) respectively illustrate a plan view and a cross-sectional view thereof.

The plastic substrate 10 is a composite substrate in which fibers 11 are embedded in a resin matrix 12. An example in which the plastic substrate 10 consists of only the composite substrate (which will also be identified by the same reference numeral "10" for that reason) will be described. However, if necessary, a protective coating (not shown) may be provided on the principal surface of the composite substrate 10. The protective coating may be made of either an organic material or an inorganic material. But typically, the protective coating is made of an inorganic material (such as silicon dioxide) that has excellent thermal resistance and barrier property (i.e., the ability to shut off water, oxygen gas and so on). The plastic substrate 10 of the present invention is preferably used in an application in which the substrate needs to transmit visible radiation, which means that the protective coating also needs to be transparent to visible radiation in that case. Furthermore, to minimize reflection at the interface between the composite substrate 10 and the protective coating, the protective coating is preferably made of a material that has approximately the same refractive index as the resin matrix 12 of the composite substrate 10.

Figure 1:
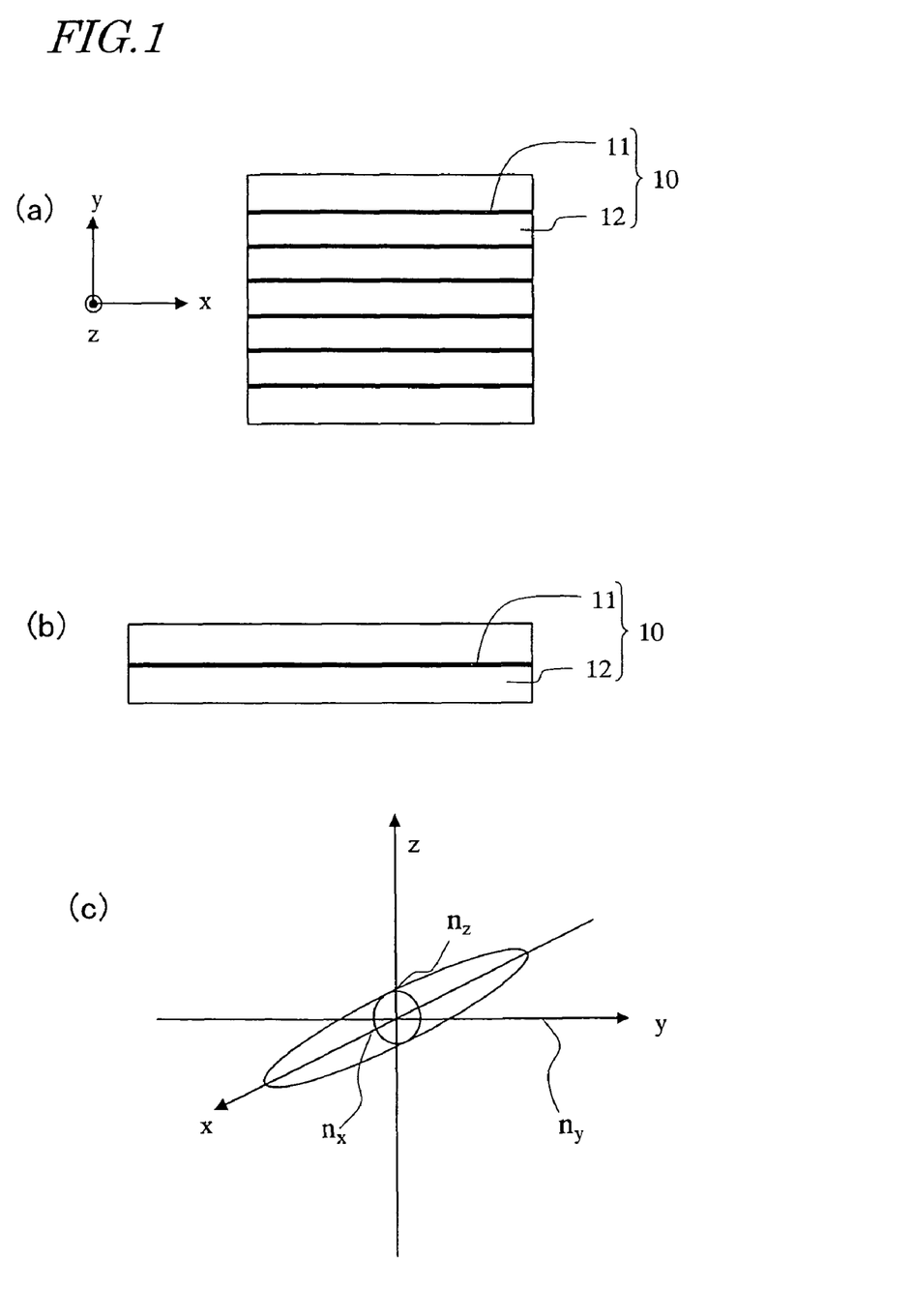

In the plastic substrate 10, the fibers 11 are arranged in one predetermined direction within a plane of the composite substrate 10. In the drawings, each of those fibers 11 is illustrated as a single fiber. However, such a fiber may be replaced with a bundle of fibers or a strand of fibers (i.e., a stranded fiber). In FIGS. 1(a) and 1(b), the fibers 11 are arranged horizontally. If the fiber 11 is replaced with a bundle or strand of fibers, each of those fibers that make up the bundle or strand (or a portion of the fiber) may have a major-axis direction that is different from the predetermined arrangement direction. However, as will be described in detail later, in the plastic substrate of the present invention, the arrangement direction of the fibers that affects the retardation is technically important. That is why the overall arrangement direction of the bundle or strand of fibers is supposed to be the fiber arrangement direction. Also, the fiber 11 does not have to be long enough to extend through the composite substrate 10 but may also consist of a number of short fibers arranged. In other words, FIG. 1 may be regarded as illustrating just a portion of the composite substrate 10.

The composite substrate 10 has a property of substantially transmitting visible radiation. Typically, both the fibers 11 and the resin matrix 12 have optical transmittance. Depending on its application, however, the plastic substrate 10 does not have to exhibit optical transmittance over the entire area thereof. In an area that does not have to exhibit optical transmittance, fibers with no optical transmittance or another filler may be mixed as well. The plastic substrate 10 of the present invention is characterized by having a predetermined retardation. Thus, an example in which the entire plastic substrate 10 has the property of transmitting visible radiation will be described for the sake of simplicity. However, if the plastic substrate 10 has any portion that may have no optical transmittance, then that portion may have a configuration to be described later.

The fibers 11 of the composite substrate 10 may be transparent organic or inorganic fiber. The fibers 11 may be any known fiber that is used to improve the mechanical properties (such as strength, rigidity and shock resistance) and thermal resistance of the composite substrate. Examples of preferred fibers include glass fibers such as E glass, D glass and S glass and high-strength, high-rigidity fibers made of a polymer such as aromatic polyamide. Naturally, short fibers of any of these materials may be used. Furthermore, multiple types of fibers may be mixed together or long fibers and short fibers may be combined together, too. Also, if the fibers 11 are arranged in a predetermined direction, then a set of fibers 11 that has been formed into a sheet shape (e.g., a woven or nonwoven fabric) may be used as well as will be described later.

The fibers 11 are arranged so as to satisfy the required mechanical strength and other properties and to make the retardation a predetermined value as will be described later. The density of the fibers 11 (which may be represented as the number of fibers per unit volume of the composite substrate) is appropriately determined according to the material thereof. To make the in-plane retardation distribution as uniform as possible, a huge number of fine fibers 11 are preferably arranged in the matrix resin 12 at a uniform density. In general, the fibers 11 preferably have a diameter of 20 µm or less, more preferably 10 µm.

The density of the fibers 11 is appropriately determined with the diameter of the fibers 11 and other factors taken into consideration. However, the fibers 11 are preferably arranged at a constant pitch within a plane of the composite substrate 10. Also, when arranged in multiple layers in the thickness direction, the fibers 11 are preferably arranged at a constant pitch in the thickness direction, too. To manufacture the composite substrates 10 as easily as possible, the fibers 11 are preferably prepared as a sheet-like set of fibers that are arranged in a predetermined direction at a prescribed pitch. The same statement applies even when the fibers 11 are replaced with bundles of fibers.

As the material of the resin matrix 12, an ordinary transparent resin (which may be a thermosetting resin or a thermoplastic resin) may be used. Examples of preferred resins include epoxy resins, phenol resins, mixtures of phenol and epoxy resins, mixtures of bismaleimide and triazine resin, polycarbonate, polyethersulfone and polyetherimide.

Generally speaking, the transparency of the composite substrate 10 is preferably high. Accordingly, to minimize the diffusive reflection at the interface between the fibers 11 and the resin matrix 12 and the scattering caused by the fibers 11, the materials of the fibers 11 and the resin matrix 12 are preferably selected such that their refractive indices are as close to each other as possible. Usually, however, the material of the resin matrix 12 may be selected from a broader range than that of the fibers 11. Also, the refractive index is preferably adjusted by modifying the resin with a substituent group introduced into the resin skeleton. For example, if a fluorine atom is introduced thereto, the refractive index can be decreased. On the other hand, if a bromine atom is introduced thereto, then the refractive index can be increased.

The composite substrate 10 may be fabricated by any of various known methods with the fibers 11 and the resin matrix 12 made of any combination of materials mentioned above. If a thermosetting resin is used, then the substrate 10 may be formed by a compression method, a roll molding method, a casting method or a transfer molding method. On the other hand, if a thermoplastic resin is used, then the substrate 10 may be formed by a compression method, an injection molding method or an extrusion method.

The fibers 11 are arranged in one predetermined direction within a plane of the composite substrate 10 as described above. That is why the plastic substrate 10 has optical anisotropy such as that shown in FIG. 1(c).

FIG. 1(c) schematically shows the index ellipsoid of the composite substrate 10. The x-y-z orthogonal coordinate system is defined in the directions shown in FIG. 1(a) with respect to the composite substrate 10. In this example, the xy plane is defined parallel to the principal surface of the composite substrate 10, the fibers 11 are arranged in the x direction, and the z-axis is defined as a normal to the principal surface of the composite substrate 10.

As shown in FIG. 1(c), in the composite substrate 10, the principal refractive index nx of the x-axis, along which the fibers 11 are arranged, is greater than the principal refractive index ny of the y-axis or the principal refractive index nz of the z-axis. The principal refractive indices ny and nz of the y- and z-axes are substantially equal to each other. The principal refractive indices of the composite substrate 10 satisfy the relationship nx>ny≈nz. Accordingly, light that has been vertically incident onto the principal surface of the composite substrate 10 has an in-plane retardation Rp between a polarized component (linearly polarized light ray) parallel to the x-axis and a polarized component (linearly polarized light ray) parallel to the y-axis. The magnitude of the in-plane retardation Rp is given by Rp=d·(ny−nx), where d is the thickness of the composite substrate 10. It should be noted that the retardations R of the composite substrate 10 normally include not only the in-plane retardation Rp but also a retardation Rth in thickness direction as well.

In general, a refractive index has wavelength dispersion. Thus, the "refractive index" refers herein to the refractive index of each plastic substrate 10 with respect to the wavelength of the light that has been transmitted through the plastic substrate 10. In an application in which visible radiation should be transmitted over its entire range (of 400 nm to 800 nm) as in a display device, a refractive index with respect to a wavelength of around 545 nm, at which the highest luminosity is achieved, may be used as a typical value.

As described above, to minimize the scattering and diffusive reflection at the composite substrate 10, both the fibers 11 and resin matrix 12 are preferably transparent and preferably have substantially equal refractive indices, and fiber with no refractive index anisotropy (e.g., glass fiber) is preferably used as the fibers 11. Likewise, a material with no refractive index anisotropy is usually preferred as the material of the resin matrix 12.

The refractive index anisotropy of the composite substrate 10 is believed to be produced photoelastically due to a thermal stress caused by a difference in thermal expansion coefficient between the fibers 11 and the resin matrix 12. That is to say, it is believed that a stress is created between the fibers 11 and the resin matrix 12 to produce the refractive index anisotropy due to photoelastic effect during the manufacturing process of the composite substrate 10.

The magnitude of the refractive index anisotropy (i.e., the birefringence), as well as the magnitude of the stress, depends on the photoelastic constants of the respective materials of the fibers 11 and the resin matrix 12. The fibers 11 are made of a material with higher elasticity than that of the resin matrix 12. Accordingly, supposing the same stress is applied, the strain caused by the resin matrix 12 should be greater than that caused by the fibers 11. For that reason, the optical anisotropy of the composite substrate 10 is mainly caused by the resin matrix 12.

As just described, the magnitude of the refractive index anisotropy of the composite substrate 10 mainly depends on the stress caused on the resin matrix 12 and the photoelastic constant of its material. The stress caused on the resin matrix 12, in turn, depends on the difference in thermal expansion coefficient between the fibers 11 and the resin matrix 12 and on the thermal hysteresis of the composite substrate 10 during the manufacturing process thereof. If the resin matrix 12 caused not only a variation in volume due to a temperature change (i.e., thermal expansion) but also another variation in volume due to a structural change (e.g., curing and shrinkage of a thermosetting resin) during the manufacturing process, then the stress would also be affected by the latter volume variation, too. Naturally, the stress caused on the resin matrix 12 also depends on the density of the fibers 11 arranged in the resin matrix 12 (i.e., the diameter of the fibers 11 or the number of fibers 11 per unit area). The retardation R to be eventually adjusted within a predetermined range also depends on the thickness d of the composite substrate 10.

As described above, the refractive index anisotropy of the composite substrate 10 depends on the specific materials of the fibers 11 and the resin matrix 12 (including the volume density of the fibers 11) and the manufacturing process. However, it is usually difficult to predict the effects of the manufacturing process theoretically. For that reason, the composite substrate 10 is preferably actually fabricated in advance as an experiment to evaluate the refractive index anisotropy thereof, and the best material and manufacturing process of the composite substrate 10 are preferably determined in view of the physical property values of the respective materials so as to achieve the desired refractive index anisotropy. Also, the retardation R may also be controlled by adjusting the thickness d of the composite substrate 10.

The composite substrate 10 shown in FIGS. 1(a) and 1(b) has refractive index anisotropy such as that shown in FIG. 1(c), in which the principal refractive index $n_x$ of the x-axis is greater than any other principal refractive index $n_y$ or $n_z$. This is because the fibers 11 are arranged in the x-axis direction and stress is caused on the resin matrix 12 along the major axis of the fibers 11, thereby increasing the principal refractive index $n_x$ in the x-axis direction. It should be noted that the refractive index is increased in the arrangement direction of the fibers 11 because the principal chain of polymers, making up the resin matrix 12, is oriented in the direction in which the stress is caused. Accordingly, if the orientation of the side chain contributes significantly to the refractive index anisotropy, then the refractive index (e.g., $n_y$) may increase in the orientation direction of the side chain (e.g., in the y-axis direction).

According to the present invention, by adopting various fiber arrangement directions, composite substrates with various refractive index anisotropies can be obtained.

Hereinafter, the configuration and function of a plastic substrate 20 according to another preferred embodiment of the present invention will be described with reference to FIGS. 2(a) through 2(c).

The plastic substrate 20 consists of only a composite substrate 20. If necessary, however, a protective coating may be provided on at least one of the principal surfaces thereof as in the plastic substrate 10 shown in FIG. 1.

The composite substrate 20 includes fibers 21 and a resin matrix 22. The fibers 21 are arranged in two orthogonal directions (e.g., in x-axis and y-axis directions in this preferred embodiment) within a substrate plane. In this preferred embodiment, the fibers 21 are arranged in two different layers such that the fibers 21 arranged in the x-axis direction do not contact with the fibers 21 arranged in the y-axis direction as shown in FIG. 2(b). Alternatively, the fibers 21 arranged in the x-axis direction may contact with the fibers 21 arranged in the y-axis direction. That is to say, the fibers 21 may be prepared as a fabric (e.g., a woven fabric). When the fibers 21 are prepared as a fabric, the fibers 21 may be woven by any of various weaving methods including plain weaving, sateen weaving and twill weaving.

In the composite substrate 20, the same fibers 21 are arranged at the same pitch in the x-axis and y-axis directions. Accordingly, the index ellipsoid of the composite substrate 20 is defined as shown in FIG. 2(c) in which the principal refractive indices $n_x$ and $n_y$ within a plane of the composite substrate 20 (i.e., the xy plane) are greater than the refractive index $n_z$ in the thickness direction (i.e., in the z-axis direction) and are substantially equal to each other. The principal refractive indices of the composite substrate 20 satisfy the relationship $n_z < n_x \approx n_y$. That is to say, the composite substrate 20 has an in-plane retardation Rp of substantially zero, a negative retardation Rth ($=d \cdot (n_z - n_x)$) in the thickness direction and negative uniaxial anisotropy.

Figure 2:
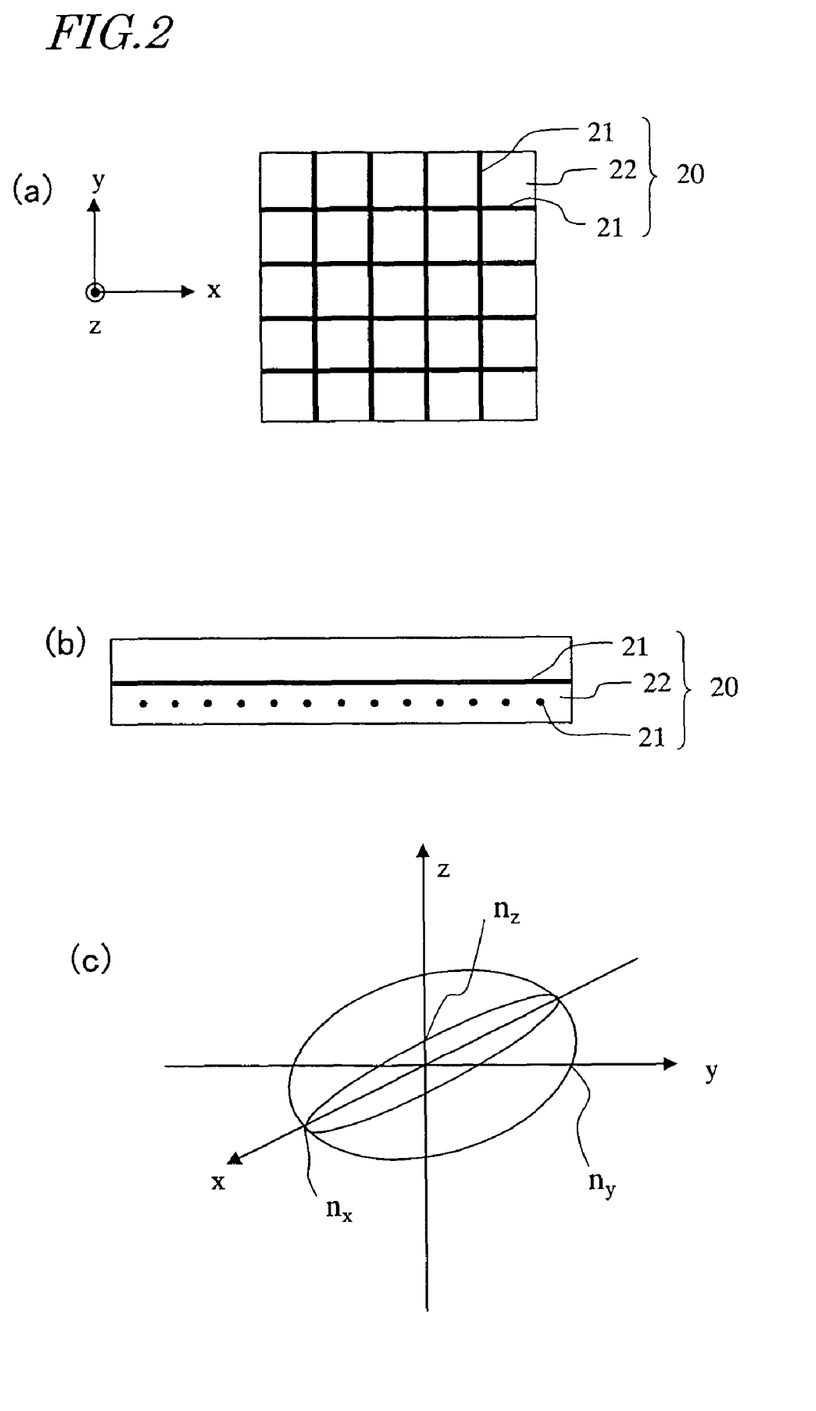

The plastic substrates 10 and 20 shown in FIGS. 1 and 2 have uniform refractive index anisotropy (retardation) over the entire surface thereof. However, the present invention is in no way limited to those specific preferred embodiments. Alternatively, the refractive index anisotropy may vary from one location on the plastic substrate (or an area within a substrate plane) to another.

The plastic substrate 30 shown in FIGS. 3(a) and 3(b) is a composite substrate 30 consisting of fiber bundles 31 and a resin matrix 32. If necessary, a protective coating may be provided on the principal surface of the composite substrate 30.

The fiber bundles 31 are arranged in two orthogonal directions (i.e., x-axis and y-axis directions in this preferred embodiment) within a substrate plane, thereby making a woven fabric. Each and every fiber bundle 31 is made of the same fibers and has the same density. Thus, this fabric is obtained by weaving substantially the same fiber bundles 31 together.

The composite substrate 30 has refractive index anisotropy that is variable from one area within the substrate plane to another. More specifically, an area 33 where the fiber bundle 31 is arranged in either the x-axis direction or the y-axis direction has such refractive index anisotropy that the refractive index $n_x$ (or $n_y$) in the arrangement direction of the fiber bundle 33 is greater than in any other direction as shown in FIG. 1(c). On the other hand, an area 34 where two fiber bundles 31 are arranged in two orthogonal directions (i.e., in the x-axis and y-axis directions) has negative uniaxial refractive index anisotropy as shown in FIG. 2(c). Furthermore, an area 35 with no fiber bundles 31 on the composite substrate 30 has an isotropic optical property ($n_x \approx n_y \approx n_z$).

If a given composite substrate has such area-dependent refractive index anisotropy as in this composite substrate 30, then the refractive index anisotropies of those areas may be used according to the intended application. For example, if the composite substrate is used as a substrate for a liquid crystal display device, the substrate may be arranged adaptively according to the given liquid crystal display mode. Specifically, the substrate may be made to function as a quarter-wave plate by associating the areas 33 with respective pixels. Alternatively, the substrate may also be made to function as a negative uniaxial phase plate by associating the areas 34 with respective pixels. As another alternative, the substrate may also be used as a transparent substrate with a high degree of optical isotropy by associating the areas 35 with the respective pixels. In that case, the plastic substrate 30 with the fibers 31 is superior in mechanical property and thermal resistance to a substrate consisting essentially of the resin matrix 32 only, and may also be used as a substrate that has better optical isotropy, and causes a lesser degree of deterioration in display quality, than a conventional composite substrate.

According to a preferred embodiment of the present invention described above, a plastic substrate with various refractive index anisotropies can be obtained. Optionally, the composite substrates 10, 20 and 30 described above may be used in any arbitrary combination. As another alternative, an assembly in which a known phase plate (e.g., a phase film) is bonded to a composite substrate according to any of the preferred embodiments of the present invention described above may also be used as a plastic substrate. A desired retardation needs to be achieved by adding the phase differences (i.e., retardations) of the composite substrate and the phase plate together. As a result, the phase plate may be designed more freely. It is also possible to use an assembly, in which a polarizer is bonded to the composite substrate, as a plastic substrate.

Next, a liquid crystal display device according to a preferred embodiment of the present invention will be described.

Figure 4:
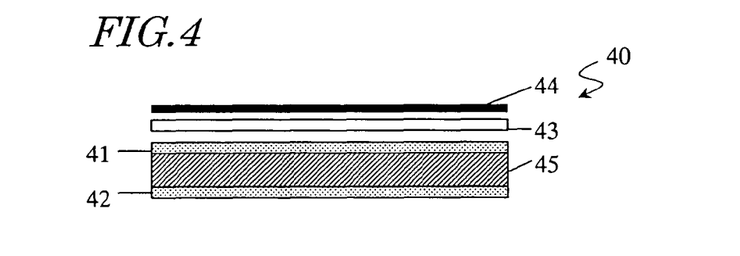
FIG. 4 is a cross-sectional view schematically illustrating a configuration for an LCD 40 according to a preferred embodiment of the present invention.

FIG. 4 schematically illustrates a cross section of a reflective LCD 40 according to a preferred embodiment of the present invention. Each of the substrates 41 and 42 of the reflective LCD 40 is the plastic substrate of the preferred embodiment described above. The substrate 42 does not have to transmit light and therefore may be a conventional plastic substrate or any other substrate. However, the substrates 41 and 42 to be bonded together with a liquid crystal layer 45 interposed between them preferably have the same mechanical property and the same thermal expansion property. That is why the same type of plastic substrates are used as the substrates 41 and 42 in this preferred embodiment.

The substrate 41 is a counter substrate, in which a counter electrode is provided on one principal surface of a plastic substrate according to a preferred embodiment of the present invention so as to face the liquid crystal layer 45. On the other hand, the substrate 42 is an active-matrix substrate, in which reflective pixel electrodes, TFTs and other circuit components (none of which are shown) are arranged on one principal surface of a plastic substrate according to a preferred embodiment of the present invention so as to face the liquid crystal layer 45, too. If necessary, an alignment film, which has been subjected to a rubbing treatment in a predetermined direction, may be further provided on that surface of the substrates 41 and 42 that is opposed to the liquid crystal layer 45. In this example, a TN mode liquid crystal layer is supposed to be used as the liquid crystal layer 45.

The LCD 40 has a phase plate 43 and a polarizer 44, which are stacked in this order on one surface of the substrate 41 that is opposed to the viewer. Any circularly polarized light ray may be incident on the liquid crystal layer. The phase plate 43 may be a quarter wave plate, for example. And the polarizer 44 is arranged such that the transmission axis (which is also called a "polarization axis" and which crosses the absorption axis at right angles) of the polarizer 44 defines an angle of 45 degrees with the slow axis of the quarter wave plate (λ/4 plate).

Figure 3:
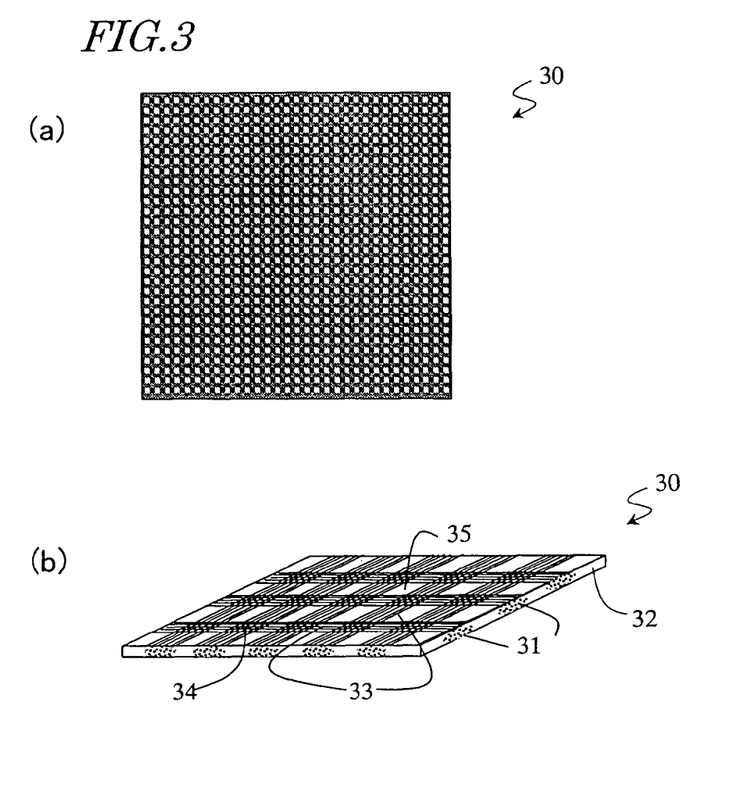
FIGS. 3(a) and 3(b) schematically illustrate a configuration for a plastic substrate 30 according to another preferred embodiment of the present invention.

In this preferred embodiment, the plastic substrate used as each of the substrates 41 and 42 is preferably the plastic substrate 20 or 30 with an in-plane retardation Rp of substantially zero as shown in FIG. 2 or 3. When the plastic substrate 30 shown in FIG. 3 is used, the areas 34 or 35 are arranged so as to be associated with the pixels. If such a plastic substrate is used, a decrease in display quality, which is caused by leakage of light due to a non-zero in-plane retardation as is observed in a conventional plastic substrate, never happens.

Figure 5:
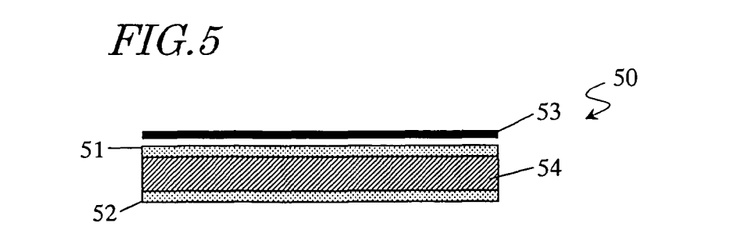
FIG. 5 is a cross-sectional view schematically illustrating a configuration for an LCD 50 according to another preferred embodiment of the present invention.

Optionally, the phase plate may be omitted as in the LCD 50 shown in FIG. 5.

The reflective LCD 50 includes a liquid crystal layer 54 between two substrates 52 and 51 and a polarizer 53 is arranged on one surface of the substrate 51 so as to face the viewer. Each of the plastic substrates as the substrates 51 and 52 is designed so as to exhibit the refractive index anisotropy shown in FIG. 1(c) and to have an in-plane retardation Rp equivalent to a quarter wavelength. On the substrate 51, the fibers are arranged so as to define an angle of 45 degrees with the absorption axis of the polarizer 53. Alternatively, the substrate 51 may also be the plastic substrate 30 shown in FIG. 3 in which the areas 33 are associated with respective pixels.

The LCD 50 achieves not only all effects of the LCD 40 shown in FIG. 4 but also another effect of omitting the phase plate 43. That is to say, not just can the components and manufacturing process be simplified but also can a thinner and lighter weight LCD be obtained as well.

A plastic substrate according to any of the preferred embodiments of the present invention described above is applicable for use in transmissive or semi-transmissive LCDs, not just reflective LCDs.

Figure 6:
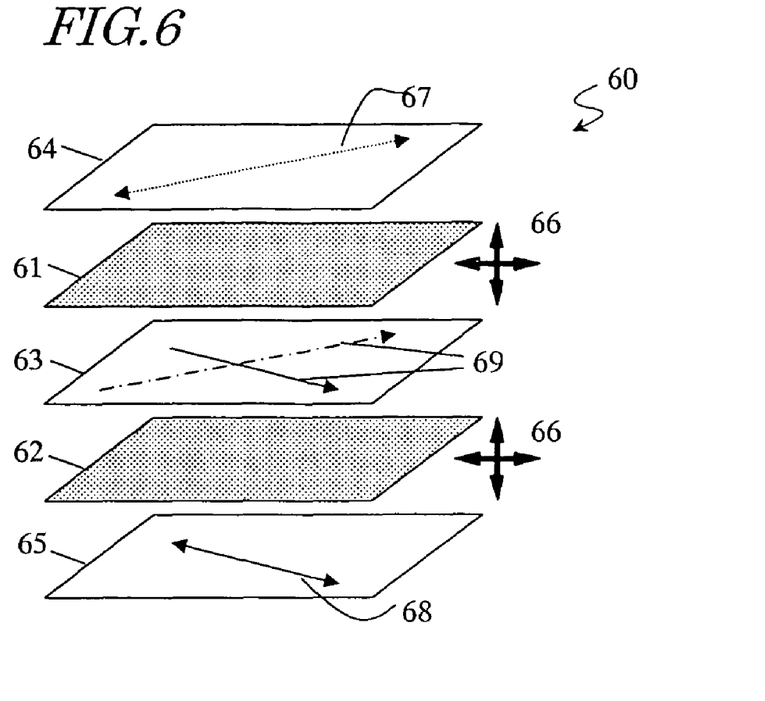
FIG. 6 is a cross-sectional view schematically illustrating an arrangement for an LCD 60 according to another preferred embodiment of the present invention.
Figure 7:
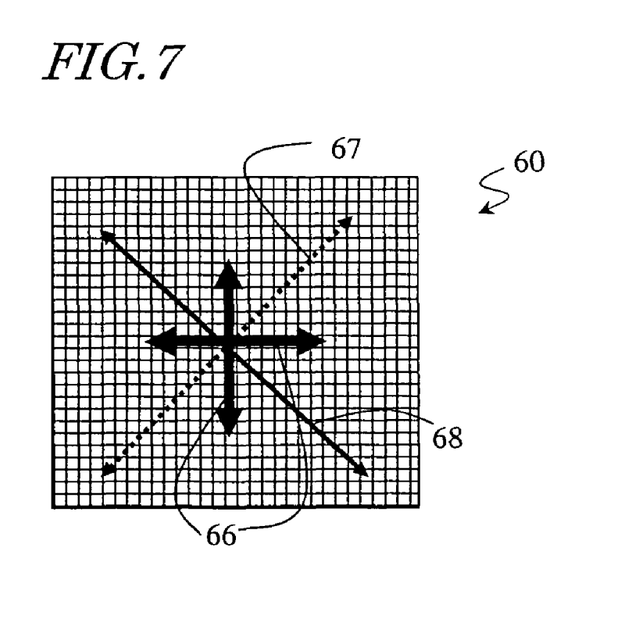
FIG. 7 schematically shows positional relationships between the fiber arrangement directions and the absorption axes of polarizers in the LCD 60.

FIG. 6 is a perspective view schematically illustrating a transmissive LCD 60 including plastic substrates according to a preferred embodiment of the present invention. FIG. 7 schematically shows the arrangement of optical axes in the LCD 60.

The transmissive LCD 60 includes two substrates 61 and 62, a liquid crystal layer 63 interposed between the two substrates 61 and 62, and polarizers 64 and 65 arranged so as to sandwich the pair of substrates 61 and 62 between them.

Each of the plastic substrates used as the substrates 61 and 62 includes fibers that are arranged in two orthogonal directions 66 as in the plastic substrate 20 or 30 shown in FIG. 2 or 3. For example, the substrate 61 may be a counter substrate in which a counter electrode is provided on one principal surface of the substrate 61 so as to face the liquid crystal layer 63. On the other hand, the substrate 62 may be an active-matrix substrate in which transparent pixel electrodes, TFTs and other circuit components (none of which are shown) are provided on one principal surface of the substrate 62 so as to face the liquid crystal layer 63, too.

The polarizers 64 and 65 are arranged such that their absorption axes 67 and 68 cross each other at right angles (i.e., as crossed Nicols). Also, the absorption axes 67 and 68 are defined so as to be obliquely tilted at 45 degrees with respect to the viewer. The fiber arrangement directions 66 of the plastic substrates used as the substrates 61 and 62 are defined so as to form an angle of 45 degrees with respect to the absorption axes 67 and 68.

The liquid crystal layer 63 is a TN mode liquid crystal layer. And the alignment films (not shown) are arranged such that each of their rubbing directions 69 becomes parallel to the absorption axis of its associated polarizer, which is provided on the same side of the liquid crystal layer 63. That is to say, the rubbing direction of the alignment film provided for the substrate 61 is parallel to the absorption axis 67, while that of the alignment film provided for the substrate 62 is parallel to the absorption axis 68.

If the plastic substrate 20 shown in FIG. 2 is used as the substrate 61, then no leakage of light will be produced because the plastic substrate 20 has an in-plane retardation Rp of substantially zero. Thus, compared to using a conventional plastic substrate of which the in-plane retardation is not controlled, display of higher quality is realized.

On the other hand, if the plastic substrate 30 shown in FIG. 3 is used as the substrate 61, the areas 34 or 35 with an in-plane retardation Rp of substantially zero are preferably arranged so as to be associated with respective pixels. Then, compared to using a conventional plastic substrate of which the in-plane retardation is not controlled, display of higher quality is realized, too.

Figure 8:
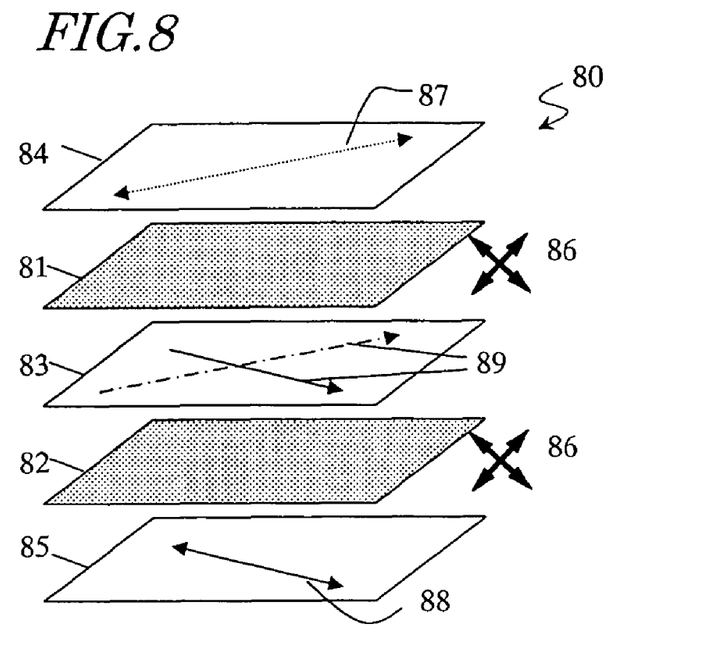
FIG. 8 is a cross-sectional view schematically illustrating an arrangement for an LCD 80 according to another preferred embodiment of the present invention.
Figure 9:
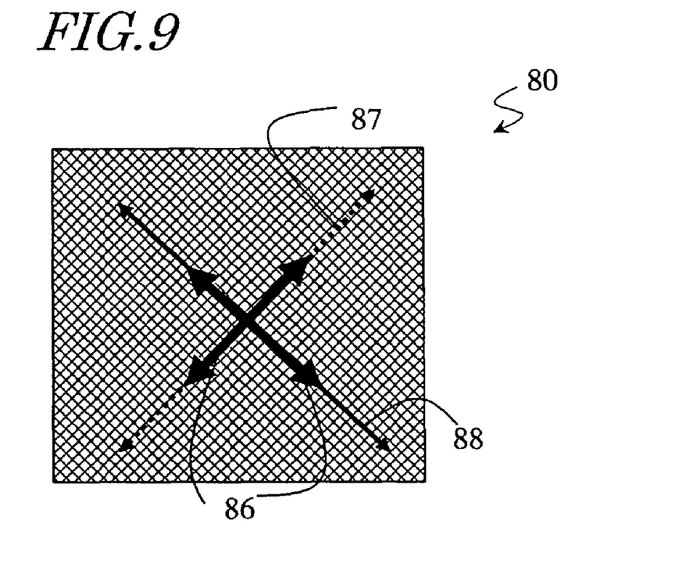
FIG. 9 schematically shows positional relationships between the fiber arrangement directions and the absorption axes of polarizers in the LCD 80.

Alternatively, the transmissive LCD 80 shown in FIGS. 8 and 9 may be fabricated using plastic substrates according to any of the preferred embodiments of the present invention described above.

FIG. 8 is a perspective view schematically illustrating a transmissive LCD 80 including plastic substrates according to a preferred embodiment of the present invention. FIG. 9 schematically shows the arrangement of optical axes in the LCD 80.

The transmissive LCD 80 includes two substrates 81 and 82, a liquid crystal layer 83 interposed between the two substrates 81 and 82, and polarizers 84 and 85 arranged so as to sandwich the pair of substrates 81 and 82 between them.

Each of the plastic substrates used as the substrates 81 and 82 includes fibers that are arranged in two orthogonal directions 86 as in the plastic substrate 20 or 30 shown in FIG. 2 or 3. For example, the substrate 81 may be a counter substrate in which a counter electrode is provided on one principal surface of the substrate 81 so as to face the liquid crystal layer 83. On the other hand, the substrate 82 may be an active-matrix substrate in which transparent pixel electrodes, TFTs and other circuit components (none of which are shown) are provided on one principal surface of the substrate 82 so as to face the liquid crystal layer 83, too.

The polarizers 84 and 85 are arranged such that their absorption axes 87 and 88 cross each other at right angles (i.e., as crossed Nicols). Also, the absorption axes 87 and 88 are defined so as to be obliquely tilted at 45 degrees with respect to the viewer. Unlike the LCD 60 shown in FIG. 6, the fiber arrangement directions 86 of the plastic substrates used as the substrates 81 and 82 are defined so as to be either parallel or perpendicular to the absorption axes 87 and 88.

The liquid crystal layer 83 is a TN mode liquid crystal layer. And the alignment films (not shown) are arranged such that each of their rubbing directions 69 becomes parallel to the absorption axis of its associated polarizer, which is provided on the same side of the liquid crystal layer 83. That is to say, the rubbing direction of the alignment film provided for the substrate 81 is parallel to the absorption axis 87, while that of the alignment film provided for the substrate 82 is parallel to the absorption axis 88.

The LCD 80 in which the fiber arrangement directions 86 are defined as described above achieves not only all of the effects of the LCD 60 shown in FIG. 6 but also the following effects as well.

In the LCD 60, if the plastic substrate 20 or 30 used as the substrate 61 or 62 has a variation in retardation (i.e., if any area associated with a pixel has an in-plane retardation Rp that is not substantially equal to zero), then leakage of light will be produced in that area.

In the LCD 80 on the other hand, even if there is any area with an in-plane retardation Rp that is not substantially equal to zero, the leakage of light can still be minimized and display of high quality is still realized. The reason is as follows. Specifically, the non-zero in-plane retardation Rp mainly results from a retardation parallel to the fiber arrangement direction. Meanwhile, one of the absorption axes 87 and 88 is perpendicular to the fiber arrangement direction that has caused that retardation. That is why the light that might leak is absorbed by one of the polarizers 84 and 85 and does not contribute to display.

In the preferred embodiments described above, the present invention is supposed to be applied to reflective and transmissive LCDs. However, the present invention is also applicable for use in a transflective (which is also called a "semi-transmissive") LCD in which a reflective region and a transmissive region are provided for each pixel.

Also, an LCD including a TN mode liquid crystal layer has been described as an example. Alternatively, the present invention is also applicable to a display mode in which the orientations of liquid crystal molecules with positive dielectric anisotropy are controlled so as to be substantially parallel to the substrate plane (e.g., an ECB mode or an IPS mode utilizing homogenous alignment).

Likewise, the present invention is further applicable to even a display mode in which the orientations of liquid crystal molecules with negative dielectric anisotropy are controlled so as to be substantially perpendicular to the substrate plane (e.g., a vertical alignment mode such as an MVA mode). In particular, in this vertical alignment mode, the retardation remaining in the liquid crystal layer has positive uniaxial refractive index anisotropy. As a result, a plastic substrate with negative uniaxial anisotropy such as that shown in FIG. 2 or 3 may be used, the conventional phase plate may be omitted, or the phase plate may be designed more freely.

As described above, a plastic substrate according to any preferred embodiment of the present invention includes fibers, which are arranged in at least one direction within a substrate plane, in a resin matrix, and the retardation thereof, associated with the fiber arrangement direction, has a predetermined value. Consequently, a display device, of which the display quality does not decrease due to leakage of light, is realized.

A plastic substrate according to the present invention can be used effectively as a substrate for not just LCDs but also any other types of display device (such as an electrophoretic display device and an organic EL display device). Furthermore, the plastic substrate can be used in not just those display devices but also various other types of optical instruments as well.

According to the present invention, a plastic substrate, which is lightweight, has excellent mechanical property and thermal resistance, and has its retardation controlled to a predetermined value, is provided. That is to say, the present invention provides a plastic substrate that contributes to realizing high-quality display when used as a substrate for a display device.

What is claimed is:

1. A display device comprising: a plastic substrate comprising:
    a composite substrate in which bundles of glass fibers are embedded in a resin matrix, the bundles of glass fibers being arranged to extend in two nearly orthogonal directions within a plane of the composite substrate; wherein
    an area of at least one glass fiber bundle arranged in either an x-axis direction or a y-axis direction, has a refractive index anisotropy such that a refractive index $n_x$ or $n_y$ in the arrangement direction of the glass fiber bundle is greater than in any other direction; wherein
    said area of said at least one glass fiber bundle is associated with a pixel such that the composite substrate substantially transmits visible radiation and is arranged as a quarter-wave plate.

2. The plastic substrate of the display device of claim 1, wherein the glass fibers are embedded in the resin matrix as a bundle of glass fibers, a woven fabric or a nonwoven fabric.

3. The plastic substrate of the display device of claim 1, further comprising a protective coating on at least one principal surface of the composite substrate.

* * * * *